No. 822,845. PATENTED JUNE 5, 1906.
G. W. JOBE.
TROLLEY WHEEL.
APPLICATION FILED JUNE 23, 1905.
2 SHEETS—SHEET 1.
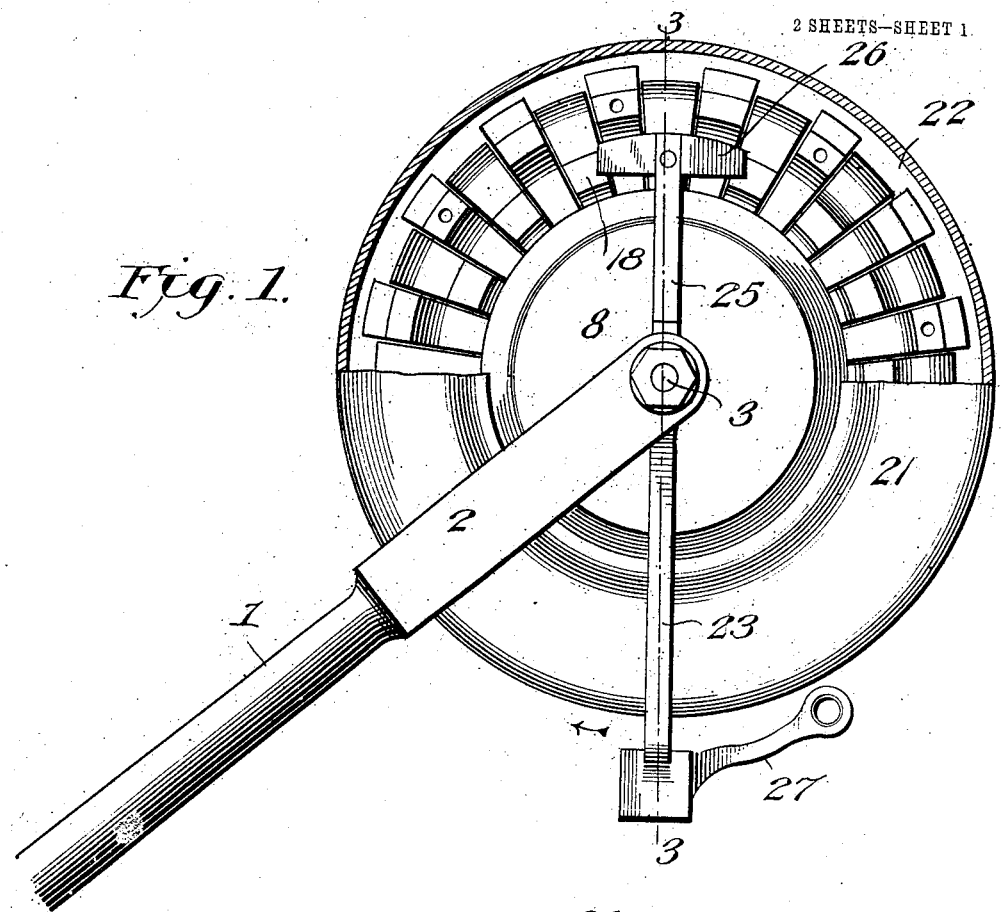
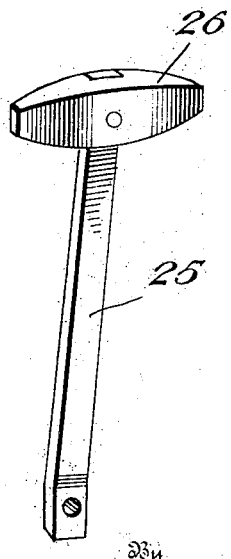

No. 822,845. PATENTED JUNE 5, 1906.
G. W. JOBE.
TROLLEY WHEEL.
APPLICATION FILED JUNE 23, 1905.
2 SHEETS—SHEET 2.
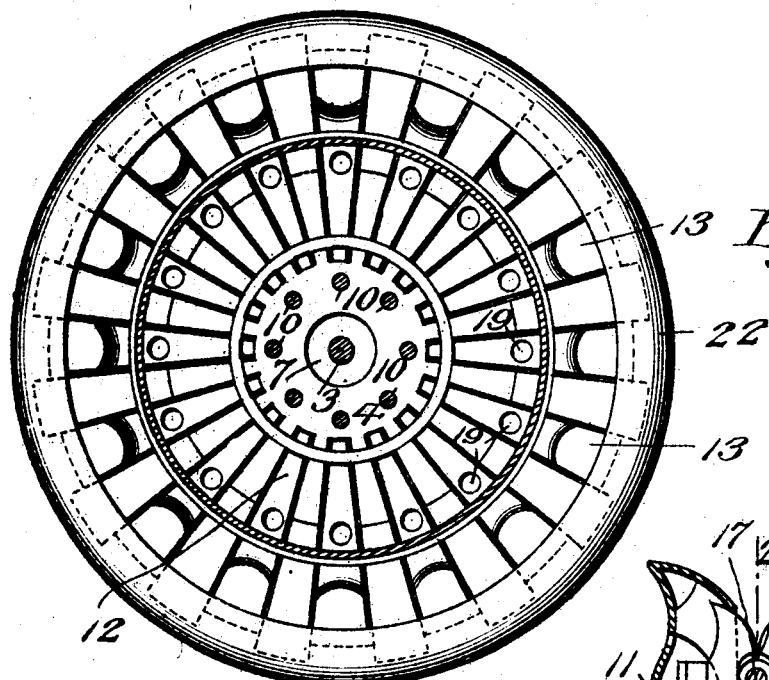
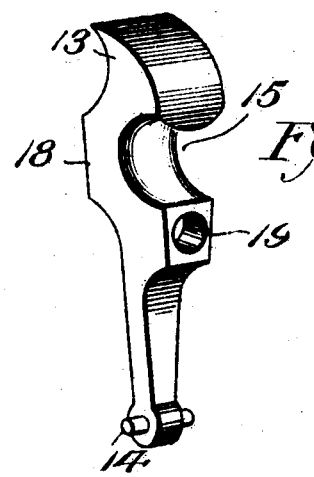
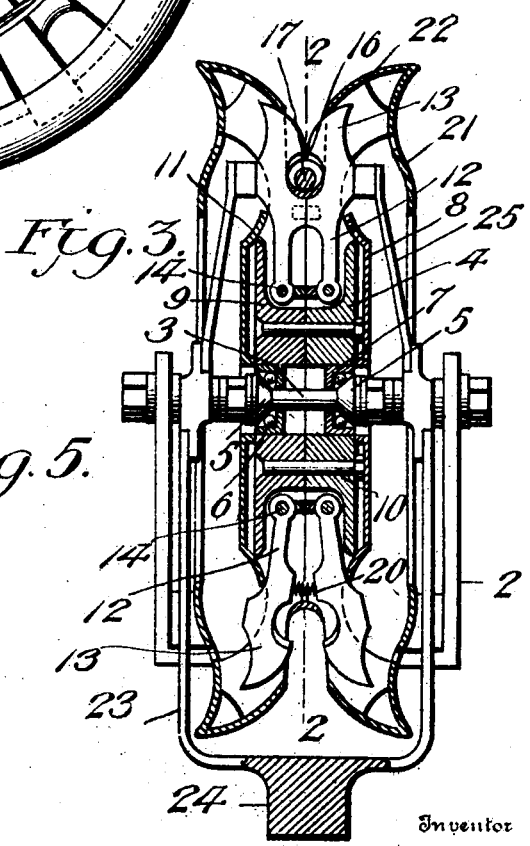
Witnesses
Geo Ackman Jr.
P. S. Elmor
Inventor
G. W. Jobe,
By Victor J. Evans
Attorney

UNITED STATES PATENT OFFICE.

GEORGE W. JOBE, OF INDIANAPOLIS, INDIANA.

TROLLEY-WHEEL.

No. 822,845. Specification of Letters Patent. Patented June 5, 1906.

Application filed June 23, 1905. Serial No. 266,601.

*To all whom it may concern:*

Be it known that I, GEORGE W. JOBE, a citizen of the United States, residing at Indianapolis, in the county of Marion and State of Indiana, have invented new and useful Improvements in Trolley-Wheels, of which the following is a specification.

This invention relates to trolley-wheels, and has for its objects to produce a comparatively simple efficient device of this character which in practice will during its travel upon be securely engaged with the trolley-wire, thus to wholly obviate liability of the wheel accidentally leaving the wire, one wherein the wire-engaging members will be moved automatically to wire engaging and releasing position during travel of the wheel, and one in which the trolley may when circumstances require be readily released from the wire.

With these and other objects in view the invention comprises the novel features of construction and combination of parts more fully hereinafter described.

In the accompanying drawings, Figure 1 is a side elevation, partly in section, of a trolley embodying the invention. Fig. 2 is a central section through the trolley, taken on the line 2 2 of Fig. 3. Fig. 3 is a transverse sectional elevation taken on the line 3 3 of Fig. 1. Fig. 4 is a detail perspective view of one of the actuating members. Fig. 5 is a similar view of one of the wire-engaging members.

Referring to the drawings, 1 designates a trolley-pole having the usual fork 2, provided with a transverse shaft 3, having rotatively mounted thereon a trolley-wheel 4, there being provided on the shaft bearing-cones 5, which, together with antifriction-balls 6, housed in ball-casings 7, permit free antifriction movement of the wheel upon the shaft. The body 4 of the wheel, which is housed within a casing 8, is made up of a pair of sections 9, detachably connected by bolts 10, said body 4 being provided with a peripheral groove or channel 11, designed to receive the stems or shanks 12 of wire-engaging members 13. The members 13, which are pivoted upon pintles or axles 14, preferably in the form of continuous rings extending around and maintained fixedly within the groove 11, are arranged in oppositely-disposed pairs, having upon their inner faces semicircular recesses 15, which conjointly form a circular opening or seat 16 for the reception of the trolley-wire 17, while the outer ends of the pairs of engaging members beyond the recesses 15 are reversely curved to permit ready entrance of the wire into the opening 16 and have upon their outer side faces opposite the recesses 15 laterally-projecting portions or enlargements 18, there being seated between each pair of engaging members and within recesses 19, formed in their inner side faces, a spring 20, which tends to move the members away from each other to wire-releasing position. It is to be noted in this particular that the pairs of engaging members 13 are arranged in juxtaposition wholly around the periphery of the wheel and that these members are protected by an outer casing 21, composed of sheet metal and having on its opposite sections inturned reversely-curved flanges 22, which serve as guides for directing the wire between the curved faces of the engaging members and thence to the opening or seat 16.

Pivotally suspended upon the shaft 3 is a substantially U-shaped member or frame 23, which straddles the trolley and is maintained in a normally vertical position by means of a weight 24, there being carried by the side portions or arms of the frame actuating members 25, preferably in the form of upwardly and inwardly inclined arms provided at their upper ends with cam-heads 26, with the inner curved faces of which the projecting portions or faces 18 of the engaging members 13 contact for moving the members 13 to wire-engaging position, it being apparent that the members 13 at the upper end of the vertical diameter of the wheel will alone be held in such engagement by the cams, whereby the wheel will ride freely upon the wire and at the same time be maintained in engagement therewith and to prevent accidental escape therefrom.

Projecting outwardly and rearwardly from the weighted portion 24 of the cam-carrying frame is an arm 27, perforated for the attachment of a cord or analogous element (not shown) whereby the frame may when circumstances require be moved from its vertical position and the heads 26 be thus brought to a point at which the engaging members will be acted upon prior to reaching the wire, to thus prevent engagement of the wire by trolley and permit of the latter being released from the former.

In practice, supposing the parts to be in normal position, as the wheel 4 revolves the pair of engaging members 13 in passing between the normally vertical actuating members 25 will be acted upon by the cams 26, and thus move to engaging position, as shown at the top of Fig. 3, to thus prevent escape of the trolley from the wire and at the same time compressing the spring 20, disposed between the members. As the members 13 move beyond the influence of the cams 26 the springs 20 will expand, thus opening the pairs of members relatively, as shown at the lower portion of Fig. 3, for releasing the wire, it being consequently understood that only one pair of the engaging members will be engaged at one time with the trolley-wire. When it is desired to wholly release the trolley from the wire, the frame 23 is swung upon its pivot in the direction indicated by the arrow in Fig. 1 through the medium of the cord engaged with the arm 27, thus to permit the engaging members to pass onto the wire in an open or non-engaging position, whereby the wheel will not be maintained in positive engagement with the wire.

From the foregoing it is apparent that I produce a comparatively simple device which is admirably adapted for the attainment of the ends in view and one wherein the engaging members are moved automatically to and from engaging positions, thus to automatically hold and release the trolley-wire, it being understood that in attaining these ends various changes in the details of construction herein set forth may be resorted to without departing from the spirit of the invention.

Having thus fully described the invention, what is claimed as new is—

1. In a device of the class described, a wheel comprising in its organization coöperating wire-engaging members movable to and from engaging position, and means for automatically actuating the members.

2. In a device of the class described, a wheel comprising in its organization engaging members disposed in pairs for engagement with a wire, means for automatically moving the members to engaging position, and means for moving them to non-engaging position.

3. In a device of the class described, a wheel comprising in its organization movable engaging members arranged in pairs for engagement with a wire, means for automatically moving the members to engaging position, and means for automatically moving them to non-engaging position.

4. In a device of the class described, a wheel provided with a plurality of pairs of engaging members adapted for successive engagement with a wire, and means for automatically and successively moving the members to engaging position.

5. In a device of the class described, a wheel having a series of pairs of members adapted for successive engagement with a wire, said members being maintained normally in non-engaging position, and means for automatically moving the members to engaging position.

6. In a device of the class described, a pair of cams, pairs of engaging members adapted to pass between said cams and to be acted upon the latter for movement to engaging position, and springs for moving the members to non-engaging position.

7. In a device of the class described, opposite series of engaging members coöperating in pairs for engagement with a wire, said members being disposed normally in non-engaging position, and actuating members designed to act successively upon the engaging members for moving the latter to engaging position.

8. In a device of the class described, a wheel comprising a body portion and a plurality of movable wire-engaging members carried thereby and designed for coöperation in engaging the wire, and means for automatically moving the members to engaging and non-engaging positions.

9. In a device of the class described, a wheel comprising a body, a plurality of pairs of movable engaging members connected with the body and adapted for engagement with a wire, means for maintaining the members normally in non-engaging position, and means for moving the wires automatically to engaging position.

10. In a device of the class described, a wheel comprising a body, coöperating wire-engaging members pivotally connected therewith, means for maintaining the members normally in non-engaging position, and actuating members between which the members pass for automatic movement to engaging position.

11. In a device of the class described, an axle, a wheel journaled thereon, coöperating wire-engaging members movably connected with the wheel, means for maintaining the members in non-engaging position, and actuating members sustained by the axle and adapted to act upon and move the engaging members to engaging position.

12. In a device of the class described, an axle, a wheel journaled thereon, coöperating wire-engaging members pivotally connected with the wheel, springs for moving the members automatically to non-engaging position, and cam members sustained on the axle to act upon and move the engaging members to engaging position.

In testimony whereof I affix my signature in presence of two witnesses.

G. W. JOBE.

Witnesses:
O. P. ANDERSON,
JNO. H. DOHERTY.